Oct. 5, 1965        T. TROTT        3,210,462
ELECTRO-OPTICAL FILM-SCANNING SYSTEM
Filed May 4, 1961
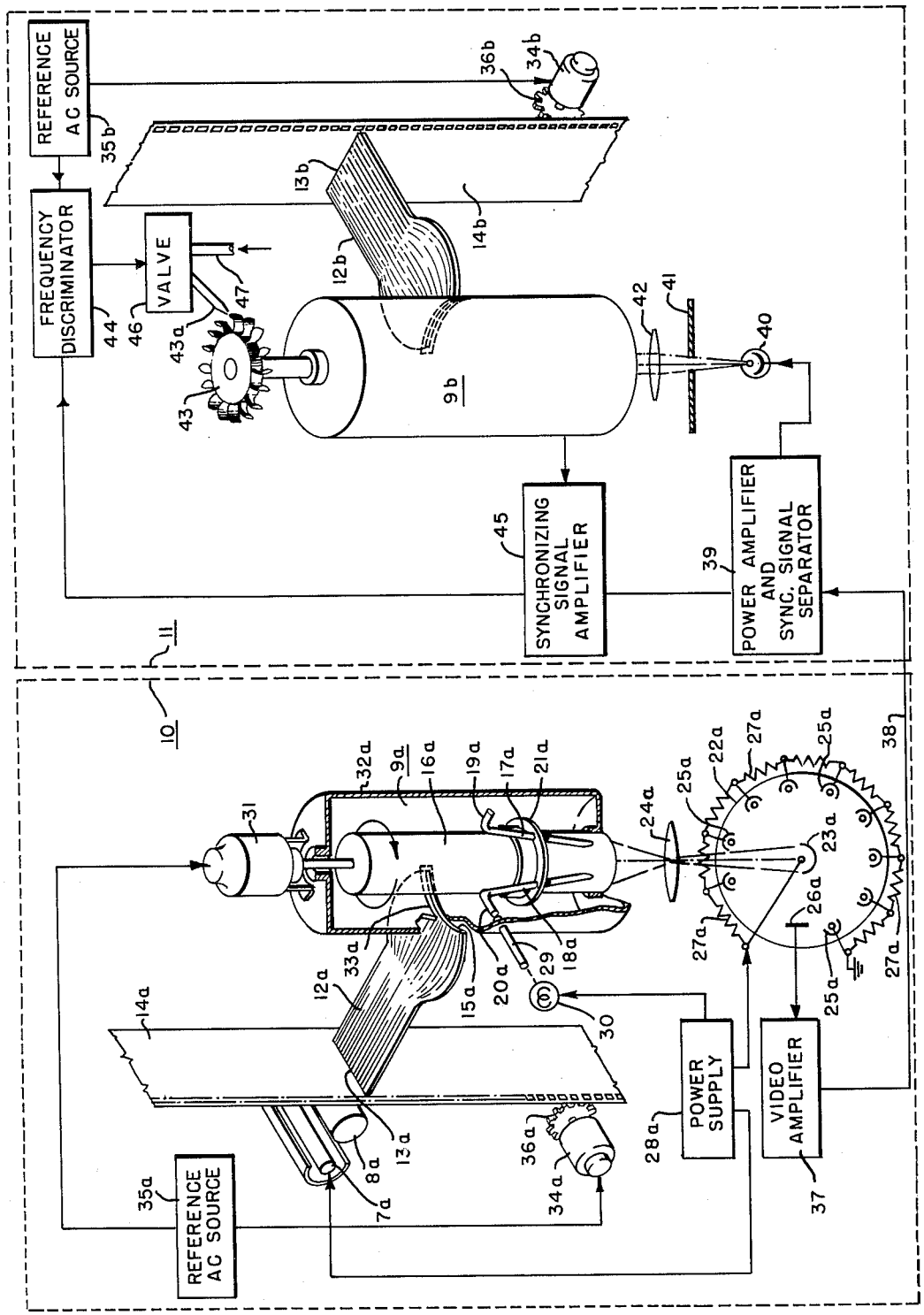

United States Patent Office 3,210,462
Patented Oct. 5, 1965

3,210,462
ELECTRO-OPTICAL FILM-SCANNING SYSTEM
Timothy Trott, Oceanside, N.Y., assignor, by mesne assignments, to Aeroflex Laboratories Incorporated, Long Island City, N.Y., a corporation of Delaware
Filed May 4, 1961, Ser. No. 107,708
21 Claims. (Cl. 178—6)

This invention relates to electro-optical film-scanning systems and, while it is of general application, it is particularly adapted for installation in remote, unattended aerial vehicles, for example, reconnaissance aircraft, drones, or satellites.

It is recognized that remote vehicles of the type mentioned are expendable to a high degree and it is important that any data picked up by their sensing instruments be transmitted promptly to the ground for display or storage. It is common practice photographically to record such data in the vehicle and several types of scanners have been developed to convert such photographically recorded data to electrical signals for transmission to the ground. These scanners generally have been either of the mechanical or cathode-ray tube type. Mechanical scanners such as the Nipkow disc, the mirror drum, etc., are electrically satisfactory and develop a signal with a high signal-to-noise ratio but are complex and cumbersome mechanically and are difficult to design, particularly for applications where high accelerations may be involved.

Cathode-ray tube scanners, on the other hand, are mechanically satisfactory but are, in general, subject to severe limitations with respect to the signal-to-noise ratio of their outputs and are complex in synchronizing the electronic scanning of the cathode-ray tube with the mechanical motion of the film. Scanners of this type also have the disadvantage of limited life expectancy of the cathode-ray tube and inaccuracies due to phosphor blemishes on the tube screen.

It is an object of the invention, therefore, to provide a new and improved electro-optical film-scanning system which obviates one or more of the above-mentioned limitations and disadvantages of prior film-scanning systems.

It is another object of the invention to provide a new and improved electro-optical film-scanning system characterized by one or more of the following advantageous characteristics: compactness in size, light weight, ruggedness, mechanical simplicity, high signal-to-noise ratio, high reliability, long life, and uniform sensitivity.

In accordance with the invention, there is provided an electro-optical film-scanning apparatus comprising a substantially planar array of optical fibers, one end of the array being substantially rectilinear for disposition transversely of a film to be scanned and the other end being substantially arcuate, and rotatable optical scanning means disposed to scan the arcuate end of the array and including means for changing the direction of transmission of light transferred between the array and the scanning means from radial to substantially axial. The expression "changing the direction of transmission of light from radial to axial" is used herein and in the appended claims to refer to such a change in direction of light transmission in either sense, that is, from radial to axial or vice versa.

More specifically in accordance with the invention, there is provided an electro-optical film-scanning pick-up apparatus comprising a substantially planar array of optical fibers, one end of the array being substantially rectilinear for disposition transversely of a film to be scanned and the other end being substantially arcuate, rotatable optical scanning means disposed to scan the arcuate end of the array and including means for changing the direction of transmission of light transferred between the array and the scanning means from radial to substantially axial, and a stationary photosensitive device disposed axially of the scanning means and responsive to light transmitted thereby to develop a video signal.

Further in accordance with the invention, there is provided an electro-optical film-exposing apparatus of the scanning type comprising a circuit for supply a video signal, a substantially planar array of optical fibers, one end of the array being substantially rectilinear for disposition transversely of a film to be scanned and the other end being substantially arcuate, rotatable optical scanning means disposed to scan the arcuate end of the array and including means for changing the direction of transmission of light transferred from the array and the scanning means from radial to substantially axial, and a light source modulated by the video signal disposed to illuminate the scanning means axially.

Further in accordance with the invention, an electro-optical film-scanning system includes a film pick-up scanner and a film-exposure scanner of the types described in the preceding paragraphs, together with circuit means for transmitting video and synchronizing signals from the pick-up unit to the film-exposure unit and means responsive to such synchronizing signals for maintaining the scanning means in the pick-up unit and that in the film-exposure unit in synchronism.

For a better understanding of the present invention, together with other and further objects thereof, reference is had to the following description, taken in connection with the accompanying drawing, and its scope will be pointed out in the appended claims.

Referring now to the drawing:

The single figure is a schematic representation of a complete electro-optical film-scanning system embodying the invention.

The present invention is predicated upon the use of "fiber optics." This phenomenom dates back many years and is relatively well understood. Briefly, if the end of a transparent rod, such as glass, is illuminated, much of the light that enters is trapped inside the rod due to total internal reflection. The light rays are reflected repeatedly from the internal walls of the rod and finally emerge from the far end. This phenomenon occurs even when the diameter of the rod is very small, that is, becomes essentially a fiber in form, and no substantial change in behavior occurs until the diameter of the rod becomes comparable to the wavelength of the incident light. The only limitation is that, in fibers of small diameter, the reflection coefficient of the surface must be very high to avoid loss of light by scattering.

It has also been discovered that if a group of such optic fibers is gathered together in an orderly bundle or array, they will transmit an image by breaking it up into separate image elements and transmitting each of these elements independently from one end of the array to the other. Obviously, the fibers must be in exactly the same arrangement at each end of the array to avoid scrambling or distortion of the transmitted image, but the disposition of the fibers between their ends becomes unimportant.

A compact bundle or array of fibers is necessary to transmit a high-quality image. However, if the fibers are placed within about a half wavelength of each other, considerable light will leak between adjacent fibers. If the fibers are small and closely packed, they will generally touch over appreciable areas, resulting in leakage of sufficient magnitude seriously to impair the image transmission. This effect is overcome by insulating each fiber with a thin jacket or coating of a transparent material having an index of refraction lower than that of the fiber. This thin coating also protects the fiber wall where total internal reflection takes place, keeping it clean and smooth. Optical glass has been found to be the best material for this coating and, in addition, it permits the fusing of the fiber bundles or arrays, accurately to maintain them in exactly similar arrangements at both ends. The result is an aggregate of polygonal coated fibers separated by a lattice of thin barriers of substantially uniform thickness. If such a bundle or array of optical fibers is systematically arranged, they will transmit an accurate image, even when the array is bent or disarranged intermediate its ends. If the fibers are completely separated, except at their ends, the array becomes very flexible and can be bent in any manner desired without impairing the transmission of the image by the array.

Such a system of image transmission by fiber optics is described in "Concepts of Classical Optics," appendix N "Fiber Optics," by John Strong, 1958, W. H. Freeman and Company, San Francisco, California. This text also describes the process of coating such optical fibers and fusing them into orderly arrays.

Coming now to the single figure of the drawing, there is schematically represented an electro-optical film-scanning system comprising an electro-optical film-scanning pick-up apparatus 10 and an electro-optical film-exposing apparatus 11 also of the film-scanning type. Each of such scanning apparatus includes a number of similar elements which are identified by the same reference characters with subscripts $a$ for the pick-up apparatus 10 and $b$ for the film-exposure apparatus 11.

Initially, reference will be made to pick-up film-scanning apparatus which includes a substantially planar array of optical fibers 12a of equal lengths and preferably of a core diameter of the order of 8 microns and an over-all diameter of the order of 10 microns. The transparent coating of the fibers is preferably of an optical glass of a lower index of refraction than the cores. The fibers are orderly and similarly arranged at each end, as by fusing, into an integral assembly but are left loose inbetween. One end 13a of the array 12a is substantially rectilinear for disposition transversely of a film 14a to be scanned. The opposite side of the film 14a is illuminated by a narrow line of light in registry with the end 13a of the array 12a by means of a linear light source 7a and a condensing lens 8a. The other end 15a of the array 12a is substantially arcuate and of a length equal to $360°/n$, where $n$ is any selected integer. In the example shown, $n$ equals 3 and the length of the arcuate end 15a is substantially 120°.

The system of the invention further comprises means disposed to scan the arcuate end 15a of the array 12a and this scanning means includes means for changing the direction of transmission of the light transferred between the array and the scanning means from a radial to an axial direction. Specifically, this scanning means 9a includes a rotating element 16a which may be cylindrical and includes $n$ scanning elements 17a and 18a, shown, and a third element not shown. These scanning elements are in the form of optical fibers having portions 19a and 20a, respectively, extending radially from the axis of rotation of the supporting element 16a, the ends of these radial portions 19a, 20a being disposed to scan the arcuate end 15a of the array 12a. The other portions of the scanning elements 17a, 18a extend substantially axially through, and to the lower end of, the cylindrical support 16a. The scanning elements 17a, 18a and the third, not shown, are equi-angularly spaced about their axis of rotation and may be supported in any suitable manner, as by means of a collar 21a mounted on the cylindrical support 16a. The scanning elements, such as the elements 17a, 18a, for mechanical strength are usually constructed in the form of a bundle of optical fibers or a single larger optical rod but, in either case, the end is preferably fitted with a mask having a single 10-micron aperture to effect the scanning operation.

The film-scanning pick-up unit 10 further includes a stationary light transducer disposed axially of the scanning means for transmitting light between itself and the scanning means. The term "light transducer" is used herein and in the appended claims to refer to a device for converting light energy into electrical energy or vice versa. In the film-scanning pick-up unit 10, the light transducer is preferably in the form of a photosensitive device, such as a photomultiplier 22a, having a photocathode 23a upon which the light emerging from the scanning elements 17a, 18a is focused by means of an objective lens 24a. The photomultiplier 22a also includes a series of dynodes or secondary electron-emitting electrodes 25a, 25a and a collector electrode or anode 26a. The dynodes 25a, 25a are connected to the junctions of a group of series-connected resistors 27a, 27a energized from a power supply unit 28a and connected between such unit and a neutral or ground terminal. Thus, the photomultiplier 22a is responsive to the light transmitted to its photocathode 23a from the scanning apparatus 9a to develop a video signal representative of the density of the successive elemental areas of the film 14a as they are scanned by the scanning apparatus.

The film-scanning pick-up unit 10 further includes means adjacent the scanning apparatus 9a for projecting a high-intensity synchronizing light beam in the path of the radial portions 19a, 20a of the scanning elements 17a, 18a, respectively, to develop a synchronizing signal synchronous with the rotation of the scanning apparatus. This synchronizing apparatus may take the form of an auxiliary optical fiber 29 having one end disposed in registry with the path of rotation of the scanning elements 17a, 18a and the other end disposed to be illuminated by a high-intensity light source such as an incandescent lamp 30. The lamp 30 may be energized from the power supply 28a.

The film-scanning pick-up unit 10 also includes motor means for driving the scanning means and for advancing the film in synchronism. This motor means may comprise a reference A.C. source 35a, for example a crystal oscillator and power amplifier combination, a motor 31 energized therefrom and mounted at the upper end of a housing 32a enclosing the scanning apparatus 9a and completely light-tight except for a slit 33a registering with the arcuate end 15a of the array 12a. For clarity, the slit 33a is shown somewhat larger than the end 15a of array 12a but actually it will form a light-tight joint therewith. The driving means further includes a motor 34a energized from the reference source 35a and driving a sprocket 36a for advancing the film 14a continuously. The motors 31 and 34a are preferably synchronous motors.

The anode 26a of the photomultiplier 22a is connected to a video amplifier 37 connected to transmit electrical signals developed by the scanning apparatus and the photomultiplier 22a to the film-scanning exposing unit 11 via a link represented schematically at 38 which, in practice, will generally be a radio link.

The film-exposing scanning unit 11 includes a scanning apparatus 9b in all respects identical to unit 9a of the film-scanning pick-up unit 10, except for the illuminating means, and need not be further described. However, the electrical apparatus associated with the scanning apparatus and its driving mechanism are substantially different. The circuit or link 38 is effective to supply the video signal developed by the pick-up apparatus 10 to a power amplifier and synchronizing-signal separator 39. The amplified video output of unit 39 is connected to energize a light source, such as a glow lamp 40, which has a negligible inertia so that the light emitted thereby is modulated in intensity by the video signal. The light from the lamp 40 is passed through an aperture plate 41 and an objective lens 42 by means of which it is focused upon the axial ends of the scanning elements of the scanning apparatus 9b.

The scanning unit 11 further includes means for maintaining its scanning apparatus 9a in synchronism with the scanning apparatus 9a of the film pick-up unit 10. This synchronizing means includes the circuit 38 which transmits the synchronizing signal developed in the unit 10 along with the video signal to the film-exposing unit 11. The unit 11 includes means responsive to the synchronizing signal transmitted by the link 38 for controlling the rotation of its scanning apparatus 9b. Specifically, this synchronizing means includes any suitable means for driving the scanning means 9b, such as an air turbine or motor 43 driven by a nozzle 43a, and a synchronous motor 34b for advancing the film 14b by means of a sprocket 36b. There is provided an alternating-current supply circuit connected to the motor 34b, for example the reference A.C. source 35b. There is also provided a frequency discriminator 44 connected to the source 35b and to a synchronizing-signal amplifier 45 coupled to the synchronizing-signal separator of unit 39 so as to respond to the frequency difference between the frequency of the incoming synchronizing signal and that of the reference source 35b. The discriminator 44 controls a valve 46 connected in a compressed air line 47 feeding the nozzle 43a. The elements 43–47, inclusive, are shown schematically since they are conventional elements and, per se, constitute no part of the present invention.

It is believed that the operation of the film-scanning system of the invention will be readily apparent from the foregoing description. In brief, as the motor 34a in the pick-up unit 10 advances the film 14a continuously and the motor 31 synchronously rotates the scanning elements 17a, 18a, these elements effectively will scan the film in a series of slightly inclined lines, the film 14a advancing the width of an optical fiber during a complete rotation of the scanning apparatus 9a. The image on the film 14a is thus analyzed and converted into a light beam emerging from the scanning apparatus varying continuously in intensity in accordance with the densities of the successive elements of the image on the film. This light beam, by means of the objective lens 24a is focused on the photomultiplier 22a which thereby develops a video signal varying in amplitude continuously with time. Concurrently, the scanning elements 17a, 18a intermittently pick up a high-intensity synchronizing light beam from the elements 29, 30 and this intermittent high-intensity beam is effective, by way of the photomultiplier 22a, to develop relatively large-amplitude synchronizing pulses interspersed between successive lines of the image. By the term "high-intensity light beam" is meant a beam of substantially greater intensity than the maximum image brightness.

The composite video and synchronizing signal is amplified in the unit 37 and transmitted by the link 38 (usually by means of a radio frequency carrier source (not shown)) to the power amplifier and synchronizing-signal separator unit 39 in the film-exposing unit 11. The video signal output of the unit 39 is impressed upon the lamp 40 to modulate its light output in accordance therewith. The modulated light beam is impressed upon the scanning apparatus 9b by way of the aperture plate 41 and the objective lens 42. The scanning apparatus 9b is effective to transmit this modulated light beam to the successive fibers of the array 12b and thereby to expose successive elemental areas of the film 14b in a scanning pattern identical to that used in analyzing the film 14a.

Normally, the reference A.C. source 35b of the film-exposure unit 11 will be identical to the reference source 35a in the film pick-up unit 10 so that these two sources will remain substantially in synchronism. Nevertheless, it is essential that the scanning of the film 14b be isochronous with that of the film 14a to avoid folding over of the edges of the reproduced image. Therefore, the synchronizing signal developed and transmitted as described is separated in the unit 39, applied to an amplifier 45, and compared in the discriminator 44 with the reference source 35b. Any difference in frequency between these two sources is utilized to control the valve 46 to maintain the rotation of the scanning apparatus 9b isochronous with that of the scanning apparatus 9a. While the valve 46 is shown as controlling the main driving nozzle 43a of the air turbine 43, it will be understood that the nozzle 43a may be an auxiliary or vernier nozzle in addition to a main driving nozzle to facilitate a more precise speed control of the scanning apparatus 9b. As a consequence, the image latent in the film 14a will be exposed upon the film 14b for development.

The electro-optical film-scanning system of the invention described above has a number of significant advantages with respect to prior systems proposed for a similar purpose, among which may be mentioned the following:

(1) The scanner of the film pick-up unit produces the required synchronizing signal directly, eliminating the requirement of a separate synchronizing-signal generator.

(2) The power requirement is considerably reduced with respect to the prior electronic systems by the elimination of the cathode-ray tube, its high-voltage supply and focus-coil current.

(3) No separate sawtooth wave generator is required in either of the pick-up unit or the film-exposure unit.

(4) The mechanical construction is such that it permits a number of different packaging arrangements of various sizes and form factors which ordinarily are not possible in prior mechanical systems employing mirrors or lens systems.

(5) The unit as a whole is considerably smaller and lighter in weight than prior designs using either cathode-ray tube apparatus or prior mechanical scanners.

(6) Because of the minimum number of rotating parts and their small sizes, the system provides maximum reliability even under conditions of extremely high acceleration.

(7) Also, due to the small size and inertia of the rotating parts, very good control of speed is obtainable with very low generated vibration, even at high speed, as well as very accurate alignment. Absence of gearing is an advantage in removing bumpiness due to gear teeth. Low inertia of the rotating parts permits approach to the inertialess scanning obtainable with a cathode-ray tube yet retains the advantages of a mechanical system.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electro-optical film-scanning apparatus comprising: a substantially planar array of optical fibers, one end of said array being substantially rectilinear for disposition transversely of a film to be scanned and the other end being substantially arcuate; and rotatable optical scanning means disposed to scan said arcuate end of said array and including means for changing the direction of transmission of light transferred between said array and the scanning means from radial to substantially axial.

2. An electro-optical film-scanning apparatus comprising: a substantially planar array of fibers of optical glass having a transparent coating of a lower index of refraction, one end of said array being substantially rectilinear for disposition transversely of a film to be scanned and the other end being substantially arcuate; and rotatable optical scanning means disposed to scan said arcuate end of said array and including means for changing the direction of transmission of light transferred between said array and the scanning means from radial to substantially axial.

3. An electro-optical film-scanning apparatus comprising: a substantially planar array of fibers of optical glass having a transparent coating of a lower index of refraction, said fibers being fused into an integral assembly at each end and loose therebetween, one end of said array being substantially rectilinear for disposition transversely of a film to be scanned and the other end being substantially arcuate; and rotatable optical scanning means disposed to scan said arcuate end of said array and including means for changing the direction of transmission of light transferred between said array and the scanning means from radial to substantially axial.

4. An electro-optical film-scanning apparatus comprising: a substantially planar array of optical fibers of equal lengths, one end of said array being substantially rectilinear for disposition transversely of a film to be scanned and the other end being substantially arcuate; and rotatable optical scanning means disposed to scan said arcuate end of said array and including means for changing the direction of transmission of light transferred between said array and the scanning means from radial to substantially axial.

5. An electro-optical film-scanning apparatus comprising: a substantially planar array of optical fibers having diameters of the order of $10\mu$, one end of said array being substantially rectilinear for disposition transversely of a film to be scanned and the other end being substantially arcuate; and rotatable optical scanning means disposed to scan said arcuate end of said array and including means for changing the direction of transmission of light transferred between said array and the scanning means from radial to substantially axial.

6. An electro-optical film-scanning apparatus comprising: a substantially planar array of optical fibers, one end of said array being substantially rectilinear for disposition transversely of a film to be scanned and the other end being substantially arcuate; and a rotatable optical scanning device having a scanning element extending radially from its axis of rotation and disposed to scan said arcuate end of said array and including means for changing the direction of transmission of light transferred between said array and said scanning element from radial to substantially axial.

7. An electro-optical film-scanning apparatus comprising: a substantially planar array of optical fibers, one end of said array being substantially rectilinear for disposition transversely of a film to be scanned and the other end being substantially arcuate; and rotatable optical scanning means including an optical fiber having one end disposed to scan said arcuate end of said array and the other end extending substantially axially.

8. An electro-optical film-scanning apparatus comprising: a substantially planar array of optical fibers, one end of said array being substantially rectilinear for disposition transversely of a film to be scanned and the other end being substantially arcuate and of a length $360°/n$, where $n$ is any selected integer; and rotatable optical scanning means including $n$ equi-angularly spaced optical fibers, each having one end disposed to scan said arcuate end of said array and the other end extending substantially axially.

9. An electro-optical film-scanning apparatus comprising: a substantially planar array of optical fibers, one end of said array being substantially rectilinear for disposition transversely of a film to be scanned and the other end being substantially arcuate; rotatable optical scanning means disposed to scan said arcuate end of said array and including means for changing the direction of transmission of light transferred between said array and the scanning means from radial to substantially axial; and a stationary light transducer disposed axially of said scanning means for transmitting light between itself and said scanning means.

10. An electro-optical film-scanning pick-up apparatus comprising: a substantially planar array of optical fibers, one end of said array being substantially rectilinear for disposition transversely of a film to be scanned and the other end being substantially arcuate; rotatable optical scanning means disposed to scan said arcuate end of said array and including means for changing the direction of transmission of light transferred between said array and the scanning means from radial to substantially axial; and a stationary photosensitive device disposed axially of said scanning means and responsive to light transmitted thereby to develop a video signal.

11. An electro-optical film-scanning pick-up apparatus comprising: a substantially planar array of optical fibers, one end of said array being substantially rectilinear for disposition transversely of a film to be scanned and the other end being substantially arcuate; rotatable optical scanning means disposed to scan said arcuate end of said array and including means for changing the direction of transmission of light transferred between said array and the scanning means from radial to substantially axial; and a stationary photomultiplier disposed axially of said scanning means and responsive to light transmitted thereby to develop a video signal.

12. An electro-optical film-scanning pick-up apparatus comprising: a substantially planar array of optical fibers, one end of said array being substantially rectilinear for disposition transversely of a film to be scanned and the other end being substantially arcuate; rotatable optical scanning means disposed to scan said arcuate end of said array and including means for changing the direction of transmission of light transferred between said array and the scanning means from radial to substantially axial; means adjacent said array for projecting a constant high-intensity synchronizing light beam in the path of said scanning means; and a stationary photosensitive device disposed axially of said scanning means and responsive to light transmitted thereby to develop a video signal.

13. An electro-optical film-scanning pick-up apparatus comprising: a substantially planar array of optical fibers, one end of said array being substantially rectilinear for disposition transversely of a film to be scanned and the other end being substantially arcuate; rotatable optical scanning means disposed to scan said arcuate end of said array and including means for changing the direction of transmission of light transferred between said array and the scanning means from radial to substantially axial; an auxiliary optical fiber adjacent said array and having one end disposed substantially in an extension of the arcuate end thereof; a light source for illuminating the other end of said auxiliary optical fiber; and a stationary photosensitive device disposed axially of said scanning means and responsive to light transmitted thereby to develop a video signal.

14. An electro-optical film-scanning pick-up apparatus comprising: a substantially planar array of optical fibers, one end of said array being substantially rectilinear for disposition transversely of a film to be scanned and the other end being substantially arcuate; rotatable optical scanning means disposed to scan said arcuate end of said array and including means for changing the direction of transmission of light transferred between said array and the scanning means from radial to substantially axial; and motor means for driving said scanning means and advancing the film in synchronism.

15. An electro-optical film-scanning pick-up apparatus comprising: a substantially planar array of optical fibers, one end of said array being substantially rectilinear for disposition transversely of a film to be scanned and the other eng being substantially arcuate; rotatable optical scanning means disposed to scan said arcuate end of said array and including means for changing the direction of transmission of light transferred between said array and the scanning means form radial to substantially axial; a pair of synchronous motors for individually driving said scanning means and advancing the film; and a common alternating-current supply circuit connected to both of said motors.

16. An electro-optical film-exposing apparatus of the scanning type comprising: a circuit for supplying a video signal; a substantially planar array of optical fibers, one end of said array being substantially rectilinear for disposition transversely of a film to be scanned and the other end being substantially arcuate; rotatable optical scanning means disposed to scan said arcuate end of said array and including means for changing the direction of transmission of light transferred from said array and the scanning means from radial to substantially axial; and a light source modulated by said video signal disposed to illuminate said scanning means axially.

17. An electro-optical film-exposing apparatus of the scanning type comprising: a circuit for supplying a composite video and synchronizing signal; a circuit for separating said synchronizing signal; a substantially planar array of optical fibers, one end of said array being substantially rectilinear for disposition transversely of a film to be scanned and the other end being substantially arcuate; rotatable optical scanning means disposed to scan said arcuate end of said array and including means for changing the direction of transmission of light transferred from said array and the scanning means from radial to substantially axial; a light source modulated by said video signal disposed to illuminate said scanning means axially; motor means controlled by said synchronizing signal for driving said scanning means; and means for advancing said film synchronously with said scanning means.

18. An electro-optical film-exposing apparatus of the scanning type comprising: a circuit for supplying a composite video and synchronizing signal; a circuit for separating said synchronizing signal; a substantially planar array of optical fibers, one end of said array being substantially rectilinear for disposition transversely of a film to be scanned and the other end being substantially arcuate; rotatable optical scanning means disposed to scan said arcuate end of said array and including means for changing the direction of transmission of light transferred from said array and the scanning means from radial to substantially axial; a light source modulated by said video signal disposed to illuminate said scanning means axially; motor means for advancing the film; and means responsive to said synchronizing signal for keeping said scanning means in synchronism therewith.

19. An elector-optical film-scanning system comprising: an electro-optical film-scanning pick-up apparatus and an electro-optical film-exposing apparatus of the scanning type, each of said apparatus including a substantially planar array of optical fibers, one end of said array being substantially rectilinear for disposition transversely of a film to be scanned and the other end being substantially arcuate, and rotatable optical scanning means disposed to scan said arcuate end of said array and including means for changing the direction of transmission of light transferred between said array and the scanning means from radial to substantially axial; a stationary photosensitive device disposed axially of said scanning means of said pick-up apparatus and responsive to the light transmitted thereby to develop a video signal; a circuit for supplying said signal to said film-exposing apparatus; and a light source modulated by said video signal disposed to illuminate axially said scanning means of said film-exposing apparatus.

20. An electro-optical film-scanning system comprising: an electro-optical film-scanning pick-up apparatus and an electro-optical film-exposing apparatus of the scanning type, each of said apparatus including a substantially planar array of optical fibers, one end of said array being substantially rectilinear for disposition transversely of a film to be scanned and the other end being substantially arcuate, and rotatable optical scanning means disposed to scan said arcuate end of said array and including means for changing the direction of transmission of light transferred between said array and the scanning means from radial to substantially axial; a stationary photosensitive device disposed axially of said scanning means of said pick-up apparatus and responsive to the light transmitted thereby to develop a video signal; a circuit for supplying said signal to said film-exposing apparatus; a light source modulated by said video signal disposed to illuminate axially said scanning means of said film-exposing apparatus; and means for maintaining said scanning means of said pick-up apparatus and said film-exposing apparatus in synchronism.

21. An electro-optical film-scanning system comprising: an electro-optical film-scanning pick-up apparatus and an electro-optical film-exposing apparatus of the scanning type, each of said apparatus including a substantially planar array of optical fibers, one end of said array being substantially rectilinear for disposition transversely of a film to be scanned and the other end being substantially arcuate, and rotatable optical scanning means disposed to scan said arcuate end of said array and including means for changing the direction of transmisison of light transferred between said array and the scanning means from radial to substantially axial; a stationary photosensitive device disposed axially of said scanning means of said pick-up apparatus and responsive to the light transmitted thereby to develop a video signal; a circuit for supplying said signal to said film-exposing apparatus; a light source modulated by said video signal disposed to illuminate axially said scanning means of said film-exposing apparatus; means in said pick-up apparatus for generating a synchronizing signal synchronous with the rotation of its said scanning means; a circuit for transmitting said synchronizing sginal to said film-exposing apparatus; and means in said film-exposing apparatus responsive to said synchronizing signal for controlling the rotation of its said scanning means.

References Cited by the Examiner

UNITED STATES PATENTS

| | | | |
|---|---|---|---|
| 1,683,136 | 9/28 | Jenkins | 178—7.6 |
| 1,751,584 | 3/30 | Hansell | 178—6.7 |
| 1,875,940 | 9/32 | Schroter | 178—7.4 |
| 2,122,750 | 7/38 | Nicolson | 178—6.8 |
| 2,661,393 | 12/53 | Bell | 178—7.6 |
| 2,778,873 | 1/57 | Nyman | 178—7.6 |
| 2,914,609 | 11/59 | Blackstone | 178—7.6 |
| 2,939,362 | 6/60 | Cole | 178—7.6 |
| 3,100,242 | 8/63 | Herbert | 178—7.6 |

FOREIGN PATENTS

| | | |
|---|---|---|
| 276,084 | 8/27 | Great Britain. |

DAVID G. REDINBAUGH, *Primary Examiner.*

E. JAMES SAX, *Examiner.*